March 22, 1949.  A. J. BENT  2,464,962
FLUID PRESSURE MOTOR
Filed Sept. 27, 1945
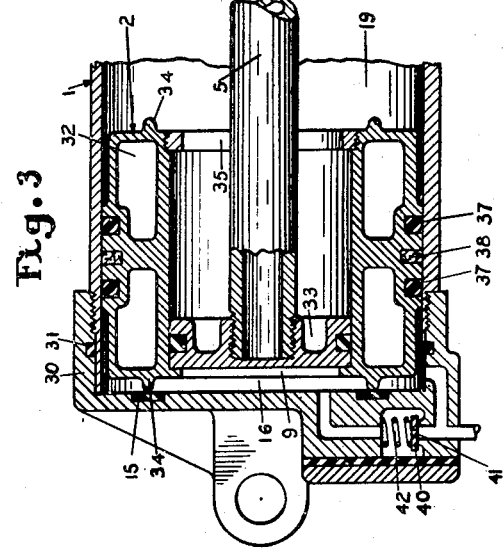
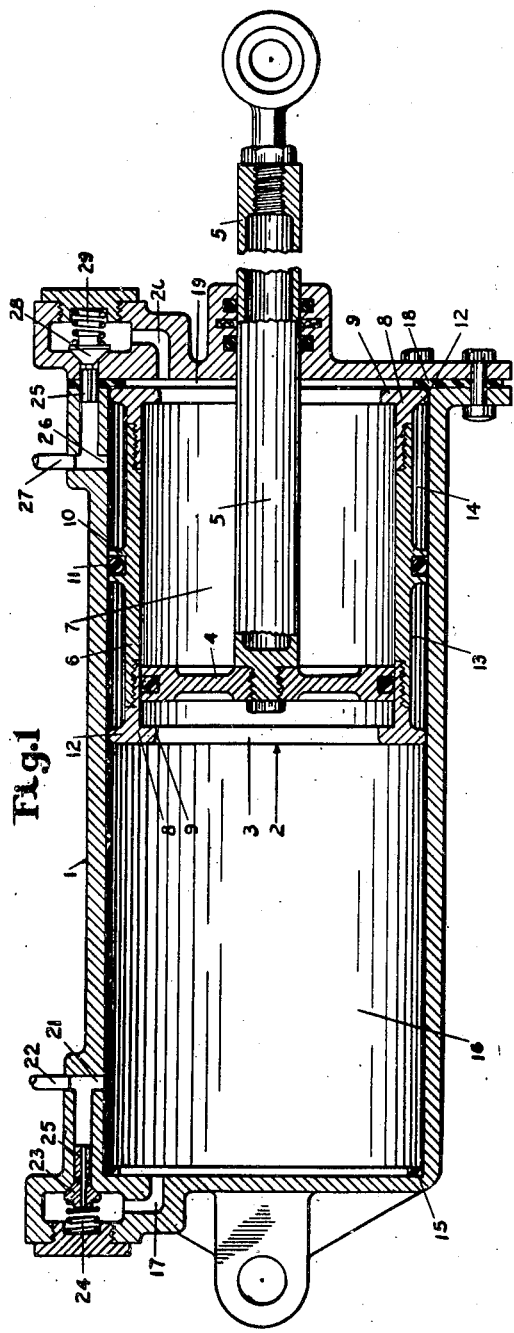
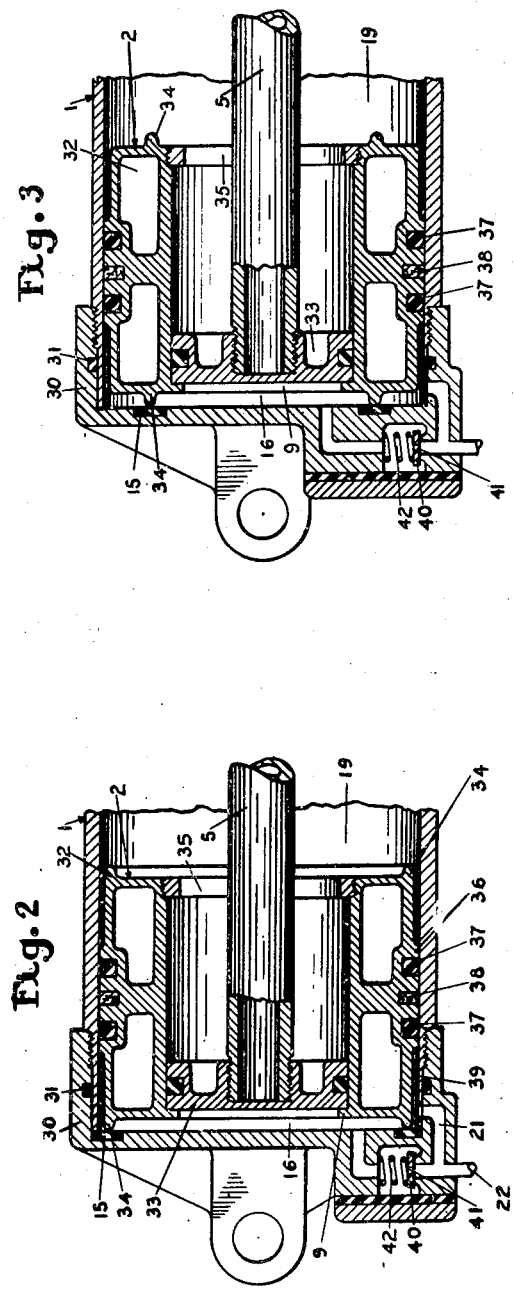
INVENTOR
ARTHUR J. BENT
BY
ATTORNEY Patented Mar. 22, 1949

2,464,962

UNITED STATES PATENT OFFICE 2,464,962

FLUID PRESSURE MOTOR

Arthur J. Bent, Wilkinsburg, Pa., assignor to The Westinghouse Air Brake Company, Wilmerding, Pa., a corporation of Pennsylvania Application September 27, 1945, Serial No. 618,838

5 Claims. (Cl. 121—44)

This invention relates to power motors of the fluid pressure responsive reciprocating piston type and has for an object the provision of a novel power motor of this type.

An object of the invention is to provide a motor of the above mentioned type having novel means for cushioning or dampening the action of the piston thereof when the piston nears the end of its stroke.

A further object of the invention is to provide a motor of the above mentioned type having a piston assemblage or arrangement whereby the force transmitted therefrom to the piston rod under the influence of any chosen fluid pressure will be reduced before the piston assemblage or arrangement completes its stroke.

A still further object of the invention is to provide a motor of the above mentioned type having a piston assemblage or arrangement in which two piston elements move in unison, under the influence of fluid under pressure, for a portion of their traverse to transmit power to the piston rod, and in which one piston element, as the piston assemblage or arrangement approaches the end of its stroke, is rendered ineffective to transmit power to the piston rod while the other piston remains effective to transmit power to the piston rod, and further in which the action of each piston element is cushioned or dampened as the element nears the end of its travel.

These and other objects will be apparent from the following detailed description of the invention.

In the accompanying drawing Fig. 1 is a diagrammatic view, mainly in section, of a fluid pressure motor embodying the invention; Fig. 2 is a fragmentary view of the same illustrating a modification of the invention; and Fig. 3 is a view similar to Fig. 2 and illustrating another modification of the invention.

According to the invention as illustrated in Fig. 1, the fluid pressure motor comprises a cylinder casing 1 and a piston assemblage 2 operatively mounted in the cylinder for reciprocating movement relative to the casing.

The piston assemblage comprises a hollow piston element or member 3 which is slidably mounted in the cylinder casing and also comprises a piston element or member 4 which is slidably mounted in the piston member 3. Attached to the piston member 4 is a piston rod 5 which may be operatively connected to or associated with a member to be actuated.

The piston member 3 comprises a body portion 6 which is provided with an axial bore 7 in which the piston member 4 is slidably mounted. Attached to each end of the body portion, preferably by means of screw threads, is a cap member 8 having an annular stop lug or flange 9 which extends inwardly toward the axis of the body portion. Instead of employing an annular stop lug or flange as shown, a plurality of circumferentially spaced lugs may be used. It will be apparent that if desired, only one separate cap member may be used since the other cap member may be formed integral with the body portion.

The stop lugs or flanges 9 of the cap members are provided for the purpose of engagement with the piston member 4 to form a couple to transmit power from the piston member 3 to the piston member 4 as will hereinafter be described more fully.

The distance between the stop lugs or flanges 9, at opposite ends of the piston member 3, is considerably greater than the thickness of the piston member 4 so that considerable relative movement between the piston members 3 and 4 is possible.

The body portion 6 of the piston member 3 is provided with a circumferential collar or guide portion 10 which has a sliding fit with the interior surface of the wall of the cylinder casing 1 and which is provided with a packing groove having mounted therein a packing ring 11 which engages the interior surface of the cylinder to prevent leakage of fluid under pressure past the guide portion. This collar or guide portion in this form of the invention is located midway between the ends of the body portion 6 and is preferably integral with such portion.

At each end of the piston member 3 the cap member 8 is provided with a peripheral guide collar 12 which is adapted to slidably engage the interior surface of the wall of the cylinder casing 1. The collars 10 and 12, the interior surface of the wall of the cylinder casing and the exterior surface of the body portion of the piston member 3 define two fluid pressure chambers, 13 and 14.

Located interiorly of the cylinder casing 1 and mounted on the cylinder head at the left-hand end of the casing is a gasket 15 which is adapted to be engaged by the corresponding end of the piston member 3 to form an airtight seal between the chamber 13 and a chamber 16 at the left-hand side of the piston assemblage, which chamber 16 is in constant open communication with a fluid pressure supply and release branch passage 17 provided in the cylinder casing. Mounted on the cylinder head at the other end of the cylinder casing is a gasket 18 which is adapted to be engaged by the corresponding end of the piston member 3 to form an airtight seal between the chamber 14 and a chamber 19 at the right-hand side of the piston assemblage, which chamber 19 is in constant open communication with a fluid pressure supply and release branch passage 20 provided in the cylinder head.

It should here be mentioned that the guide collars 12 do not provide an airtight seal between the chambers 13 and 14 and the chambers 16 and 19, respectively, but do serve to restrict the flow of fluid from chamber 16 or 19 to the respective chamber 13 or 14, as the case may be, for reasons which will be hereinafter fully described.

The supply and release branch passage 17 is connected to a fluid pressure supply and release passage 21 which is provided in the cylinder casing and which is in open communication with a fluid pressure supply and release pipe 22 and with the chamber 16 when the piston assemblage is at the right-hand end of the cylinder as shown in Fig. 1. Interposed in the branch passage 17 is a combined check valve and choke element 23 which, when seated on a seat provided in the cylinder casing, will restrict the flow of fluid from the chamber 16 by way of passage 17. This element is normally maintained seated by means of a light coil spring 24. The element comprises a guide stem 25 which is fluted to provide for a relatively unrestricted flow of fluid from the passage 21 to the chamber 16, when fluid under pressure unseats the valve of the element against the opposing action of spring 24.

The supply and release branch passage 20 is connected to a supply and release passage 26 which is in open communication with a fluid pressure supply and release pipe 27 and with chamber 14, there being interposed in the passage 20 a combined check valve and choke element 28 which is identical with the combined check valve and choke element 23 and which is normally maintained seated by means of a light coil spring 29. This element 28 functions to control the flow of fluid from chamber 19 in the same manner as the element 23 functions to control the flow of fluid from chamber 16.

It will be understood from the following description of the operation of the motor that when fluid under pressure from a suitable fluid pressure supply source is admitted to the chamber at one side of the piston assemblage 2, fluid under pressure is released from the chamber at the other side of the assemblage. In order to accomplish this any suitable control valve arrangement may be provided, such for instance, as a single manually operative valve device which when operated to one position will establish an open communication from the fluid pressure supply source to one of the fluid pressure supply and release pipes and will also establish an open communication from the other fluid pressure supply and release pipe to the atmosphere. When turned to a second position the control valve device would reverse the supply and release communications. Since such control valve devices are well known in the fluid pressure art and since such a device forms no part of the present invention, a showing and further description thereof is deemed unnecessary.

Operation

Let it be assumed that fluid under pressure is being admitted to the chamber 16 by way of the fluid pressure supply and release pipe 22 and passage 21 and that fluid under pressure is being released from the chamber 19 by way of the supply and release branch passage 20, the flow restricting passage in the combined check valve and choke element 28 and the fluid pressure supply and release passage 26 and pipe 27. Let it further be assumed that the piston assemblage has moved under the influence of the pressure of fluid in chamber 16 to the position in which it is shown in Fig. 1.

With the piston assemblage in this position, the right-hand end of the piston member 3 will be in sealing engagement with the gasket 18. Since the piston member 3 is stationary due to such engagement with the gasket, the piston member 4 will move in the direction of the right hand relative to the piston member 3 under the influence of fluid pressure differential created across the piston by the supply of fluid under pressure to chamber 16 and the release of fluid under pressure from the chamber 19. The release of fluid under pressure from the chamber is at a relatively slow rate as governed by the flow capacity of the flow restricting passage 25 in the combined check valve and choke element 28, the valve portion of the element being seated as shown. Due to this slow rate of release of fluid under pressure from the chamber 19, the pressure of fluid in the chamber, due to the displacement of the piston, will serve to yieldably resist or oppose movement of the piston and thus cushion or slow down the speed of the piston so that it will not strike the lug or flange 9 on the right-hand end of the piston member 3 with undue or damaging force.

Assuming now that the piston member 4 is in engagement with the lug 9 on the piston member 3 and the piston member 3 is in the position in which it is shown in Fig. 1 and it is desired to move the piston assemblage in the direction toward the left hand, fluid under pressure is released from chamber 16 and fluid under pressure is admitted to the chamber 19 by way of the supply and release pipe 27 and branch passage 20, the pressure of fluid in the branch passage unseating the combined check valve and choke element 28 against the opposing pressure of the spring 29.

Fluid under pressure admitted to chamber 19 acts on both the right-hand face of the piston member 3 and the right-hand face of the piston member 4, and since, as just described, the lug 9 on the right-hand end of the piston member 3 is in abutting engagement with the right-hand face of the piston member 4, both piston members move in unison in the direction of the left-hand and thus actuate the piston rod 5 and thereby any element or elements which may be operatively associated therewith. It will here be noted that due to the power couple between the two piston members the power exerted by both piston members is transmitted to the piston rod 5.

Fluid under pressure also flows from the fluid pressure supply and release passage 26 to the chamber 14 but this will have no effect upon the movement of the piston assemblage since the areas of the collars 10 and 12 over which the fluid pressure in the chamber acts are substantially equal. When, however, the collar 12 at the right-hand end of the piston member 3 passes the orifice of the passage 26, such passage will admit fluid under pressure to the chamber 19. As a result of this, the fluid pressures on both sides of the combined check valve and choke element 28 will equalize, whereupon the spring 29 will act to seat the valve portion of the element, thus conditioning the element for restricting the release of fluid under pressure from the chamber 19 whenever the piston assemblage is moved again toward the right-hand end of the cylinder casing 1.

It will be understood that until such time as the collar 12 at the left-hand end of the piston member 3 passes the orifice of passage 21 the release of fluid under pressure from chamber 16 will be by way of this passage. However, as soon as the collar reaches a position just beyond the passage the release of fluid under pressure will be at a retarded rate by way of the branch passage 17 and the combined check valve and choke element 23. Since the guide collar does not form an airtight seal with the interior surface of the cylinder casing, fluid may leak past the collar to the chamber 13 and from thence escape by way of passage 21. The rate of flow of fluid from the chamber 16 will be such that if the piston assemblage is traveling at such a rate of speed that the piston member is liable to damage the end of the cylinder or to become damaged by the cylinder, the pressure in chamber 16 will be increased, due to the displacement of the piston, sufficiently to reduce the speed of the piston member 3 so that it will complete its traverse without danger of damage to the casing or the member.

When the piston member 3 comes to rest in sealing engagement with the gasket 15 the member can no longer transmit power to the piston member 4 so that the piston member 4 alone serves to transmit power to the piston rod 5. It will be apparent that since the piston member 3 is stopped, the effective area of the piston assemblage over which the fluid pressure acts is decreased, so that the resistance offered by the load being moved by the piston rod will serve to decrease the speed at which the piston member is moving. It will also be apparent that since there is no longer a communication from the chamber 16 past the guide collar 12 to the chamber 13 through which fluid may escape from chamber 16, the passage 25 in the combined check valve and choke element 23 will so retard the rate of flow of fluid from the chamber 16 that if the piston is traveling at a speed fast enough that it would strike the stop lug 9 on the left-hand end of the piston member 3 with undue force, the piston member 4, as it is displaced relative to the piston member 3, causes the pressure of fluid in chamber 16 resisting movement of the piston member 4 to increase, thus the fluid pressure in chamber 16 serves to cushion the action of the piston member 4. From this it will be seen that by eliminating the piston member 3 as a power transmitting element and by cushioning the action of the piston member 4 as it moves relative to the piston member 3, the gentle movement of the piston member 4 to the end of its stroke is insured. In some instances the fluid pressure motor may be suddenly relieved of its load before the piston assemblage has completed its stroke and before the supply of fluid under pressure to the cylinder casing can be cut off, but the cushioning of the piston in the manner hereinbefore described will, under such conditions, effectively prevent the piston assemblage from slamming against an end of the casing.

If when the piston assemblage has reached the position in which it is shown in Fig. 1 an operator should decide to reverse the direction of movement of the piston assemblage he will operate the control valve device to admit fluid under pressure to chamber 19 and to release fluid under pressure from chamber 16. The piston member 3 since it has no load imposed thereon and has only to overcome the normal friction between itself and the casing 1 and the piston member 4, will quickly move in the direction of the left hand relative to the piston member 4 under the influence of the pressure of fluid in chamber 19. This movement of the piston member 3 relative to the piston member 4 will continue until such time as the lug 9 on the right-hand end of the piston member 3 engages the right-hand face of the piston member 4, at which time both piston members will move in unison and thereby apply power to the piston rod 5. As the piston assemblage continues to move in the direction of the left hand the piston members will be cushioned in the same manner as hereinbefore described.

Description of the apparatus of Figure 2

In this form of the invention the cylinder casing 1 instead of having an integral head as shown in Fig. 1 is provided with a separate head which has screw threaded connection with the casing and which is provided with an internal groove having mounted therein a gasket 31 which engages the exterior surface of the casing to form an air tight seal between the head and the casing.

The piston assemblage comprises piston members 32 and 33 which differ slightly in construction from that of the corresponding piston members 3 and 4 of the form of the invention shown in Fig. 1.

The piston member 32 is of annular box like form having at each of its ends an annular seating rib 34 which, at one end, is adapted to seal against the gasket 15 located at one end of the cylinder casing and which, at the other end, is adapted to seal against a suitable gasket at the corresponding end of the cylinder casing. This piston member is provided with a lug 9 and at the other end is provided with a ring 35 which has screw-threaded engagement with a member, which lug and ring are for engagement with the piston member 33 which is operatively mounted in the piston member 32.

The piston member 32 is also provided with an annular guide collar 36 having spaced grooves therein in which is mounted packing rings 37. Between the grooves for the packing rings 37, the collar is provided with a groove in which there is mounted a lubricant saturated ring 38 of felt or other suitable material which engages the interior surface of the cylinder casing to spread lubricant evenly over said surface.

In this form of the invention the fluid pressure supply and release passage 21 enters the cylinder casing near the left-hand end thereof so that very little cushioning of the piston member 32 will be realized, however, in instances where a more effective cushioning action is required, the passage 21 will be made to enter the cylinder at a point located further to the right and the diameter of the piston will be increased to decrease the space 39 between the member and the cylinder casing sufficiently to choke the flow of fluid from the chamber 16 to the passage 21.

The cushioning of the piston member 33 will, in either instance, be accomplished in substantially the same manner as hereinbefore described in connection with the piston member 4 of the fluid pressure motor illustrated in Fig. 1.

As shown the combined check valve and choke element is made in the form of a disc 40 having a flow restricting passage 41 therein for controlling the release of fluid under pressure from the chamber 16, the disc being biased toward its seated position by a light coil spring 42. At the other end of the cylinder casing a corresponding combined check valve and choke element will be provided for controlling the release of fluid under pressure from the chamber 19 at the right-hand side of the piston assembly.

It will here be understood that while the description of this form of the invention has been limited more or less to the left-hand end of the motor, the right-hand end will be constructed in substantially the same manner so that the cushioning of the piston assemblage will be effective as the assemblage approaches either end of its stroke. The cylinder head at the right-hand end of the cylinder casing and not shown, will of course be provided with a piston rod guide which may be the same as shown in Fig. 1.

Description of the apparatus of Fig. 3

In this form of the invention the construction of the fluid pressure motor differs from that of the motor shown in Fig. 2 in that each of the sealing ribs 34 on the piston member 32 is made of less diameter than that of the corresponding rib in Fig. 2. The gaskets which these ribs engage are also made of smaller diameter. This arrangement, as will now be described, will serve to prevent an unwanted operation of the piston assemblage under certain operating conditions in some instances.

In cases where the fluid pressure motor is employed, the mechanism which is operated by the motor may be such that after the piston member 32 is seated on the gasket 15 and before the piston member 33 has made its full traverse, the load, instead of resisting movement of the motor, acts in the opposite direction to assist the fluid under pressure in moving the piston member 4 (Fig. 1) in the direction it is already traveling. When this occurs the sudden displacement of the piston member 4 may cause the pressure in chamber 16 to be increased above that of the fluid in chamber 19. This high pressure in chamber 16 of the motor shown in Fig. 2 for instance, may cause the piston member 32 to move to the right relative to the piston member 34 and connect the chamber 16 to the passage 21, so that fluid in chamber 16 would be rapidly released to the atmosphere. This would of course destroy the fluid pressure cushion and the piston assemblage would as a consequence slam against the end casing with undue force.

By reducing the diameter of the sealing rib 34, the area of the face of the piston member 32 which is exposed to the pressure of fluid in chamber 16 is considerably less than that exposed to the pressure of fluid in chamber 19, so that any excess pressure in chamber 16 will not move the piston member 32 relative to the piston member 33 and thus prevent the above-mentioned unwanted and objectionable operation of the piston assemblage.

Having now described my invention, what I claim as new and desire to secure by Letters Patent is:

1. In a fluid pressure motor, a cylinder, a piston comprising two movable piston elements operatively mounted in said cylinder, a piston rod secured to one piston element, said piston elements cooperating to form a pressure face having a certain area over which fluid under pressure may act to transmit power to said piston rod, a gasket for sealing engagement with and for also limiting thereby the distance of travel of the other piston element to render the element ineffective to transmit power to said piston rod, the said one piston element being capable of continuing to transmit power to said piston rod after said other piston element has been rendered ineffective, an exhaust communication through which fluid at the other side of the piston flows from the cylinder at a relatively fast rate during full traverse of said other piston element while both piston elements are in motion, and means rendered effective by the engagement of said other piston element with said gasket for restricting the rate of flow of fluid through said exhaust communication so as to produce a fluid pressure cushion for yieldably opposing movement of said one piston element and thereby said piston rod relative to said other piston element.

2. In a fluid pressure motor, a cylinder, a piston comprising two movable piston elements operatively mounted in said cylinder, a piston rod operatively connected with one piston element, said piston elements cooperating to form a pressure face having a certain area over which fluid under pressure may act to transmit power to said piston rod, a gasket for sealing engagement with and for also limiting thereby the distance of travel of the other piston element to render the element ineffective to transmit power to said piston rod, the said one piston element being capable of movement relative to said other piston element when said other piston element is in engagement with said gasket, a communication through which fluid under pressure is admitted to said cylinder to act on one side of said piston, an exhaust communication through which fluid at the other side of the piston flows from the cylinder at a relatively fast rate during full traverse of said other piston element while both piston elements are in motion, and choke means rendered solely effective by the engagement of said other piston element with said gasket for restricting the rate of flow of fluid through said exhaust communication so as to produce a fluid pressure cushion for yieldably opposing movement of said other piston element relative to said one piston element.

3. In a fluid pressure motor, a cylinder, a piston operatively mounted in said cylinder and comprising two piston elements, one element slidably engaging the wall of said cylinder and the other element being slidably mounted in said one element, a piston rod operatively connected to said other element, means whereby the piston elements cooperate to transmit power to said piston rod in response to fluid under pressure which may be admitted to the cylinder at one side of the piston, a gasket associated with said cylinder for sealing engagement with said one element and to also limit thereby the distance of travel of the element and thereby render the element ineffective to transmit power to said piston rod, said other element being capable of movement relative to said one element when said one element is in engagement with said gasket, a communication through which fluid under pressure is admitted to said cylinder to act on one side of said piston, an exhaust communication through which fluid at the other side of the piston flows from said cylinder at a relatively fast rate during full traverse of said one element while said piston elements move in the direction toward said gasket, and choke means rendered solely effective, when said one element sealingly engages said gasket, to decrease the rate of flow of fluid from the cylinder through said exhaust communication.

4. In a fluid pressure motor, a cylinder, a piston operatively mounted in said cylinder and comprising two piston elements, one element slidably engaging the wall of said cylinder and the other element being slidably mounted in said one element, a piston rod operatively connected to said other element, means causing said piston elements to cooperate to transmit power to said piston rod in response to the pressure of fluid which may be admitted to the cylinder at one side of the piston, a gasket associated with said cylinder for sealing engagement with said one element and to also limit thereby the distance of travel of the one element and thereby render the one element ineffective to transmit power to said piston rod, said other element being capable of movement relative to said one element when said one element is in engagement with said gasket, a communication through which fluid under pressure is admitted to said cylinder to act on one side of said piston, an exhaust communication through which fluid at the other side of the piston flows from said cylinder at a relatively fast rate during full traverse of said one element while said piston elements move in the direction toward said gasket, and a choke rendered effective to alone decrease the rate of flow of fluid from the cylinder through said exhaust communication when said one element moves into sealing engagement with said gasket.

5. In a fluid pressure motor, a cylinder, a piston operatively mounted in said cylinder and comprising two piston elements, one element comprising an annular portion slidably engaging the wall of said cylinder and an annular integral end portion spaced away from said wall and the other element being slidably mounted in said one element, a piston rod operatively connected to said other element, means causing said piston elements to cooperate to transmit power to said piston rod in response to the pressure of fluid which may be admitted to the cylinder at one side of the piston, a gasket associated with the end of said cylinder for sealing engagement with the outer end of said end portion and to thereby limit the travel of the one element and thereby render the one element ineffective to transmit power to said piston rod, said other element being movable relative to said one element when said one element is in engagement with said gasket, a communication through which fluid under pressure may be admitted to said cylinder to act on one side of said piston, an exhaust communication through which fluid under pressure may flow from said cylinder at a relatively fast rate and disposed in the wall a distance away from the end less than the length of said end portion, and a restricted exhaust communication encircled by said gasket so that the rate of flow of fluid from the cylinder will be reduced when said one element engages said gasket.

ARTHUR J. BENT.

REFERENCES CITED

The following references are of record in the file of this patent:

UNITED STATES PATENTS

| Number | Name | Date |
|---|---|---|
| 834,825 | Logan | Oct. 30, 1906 |
| 840,877 | Steedman | Jan. 8, 1907 |
| 850,583 | Howard | Apr. 16, 1907 |
| 1,231,257 | Herr | June 26, 1917 |
| 1,905,065 | Scholl | Apr. 25, 1933 |
| 1,930,901 | Meachem | Oct. 17, 1933 |
| 2,259,576 | MacMillin | Oct. 21, 1941 |

FOREIGN PATENTS

| Number | Country | Date |
|---|---|---|
| 479,434 | France | Jan. 4, 1916 |